Aug. 11, 1925.

M. T. CEBAR

SLED

Filed April 26, 1922

Marion T. Cebar
INVENTOR.

BY
Erwin, Wheeler & Woolard
ATTORNEYS.

Patented Aug. 11, 1925.

1,549,448

UNITED STATES PATENT OFFICE.

MARION T. CEBAR, OF WAUKESHA, WISCONSIN.

SLED.

Application filed April 26, 1922. Serial No. 556,629.

*To all whom it may concern:*

Be it known that I, MARION T. CEBAR, a subject of the King of Serbia, residing at Waukesha, county of Waukesha, and State of Wisconsin, have invented new and useful Improvements in Sleds, of which the following is a specification.

This invention relates to sleds.

Objects of this invention are to provide a novel form of sled in which the top board is secured in an effective and simple manner; in which greater security is provided for the rider against lateral and against longitudinal motion with reference to the sled; and to provide a rest for the rider for aiding in his comfort and also for preventing his slipping forwardly off of the sled, in case the sled is suddenly arrested.

Further objects are to provide a sled in which a small number of parts are required for its construction, to provide a sled which may be cheaply manufactured, and to provide a sled which is of attractive and pleasing design.

An embodiment of the invention is shown in the accompanying drawing, in which:—

Figure 1:
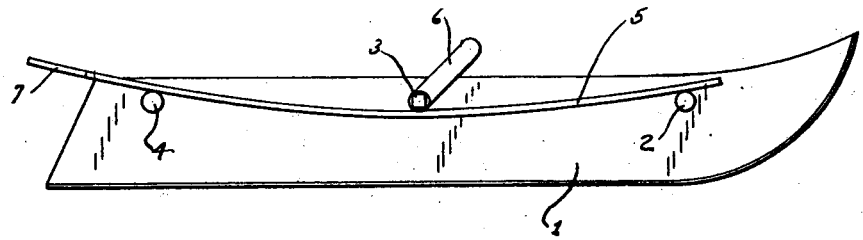
Fig. 1 is a longitudinal sectional view of the sled.
Figure 2:
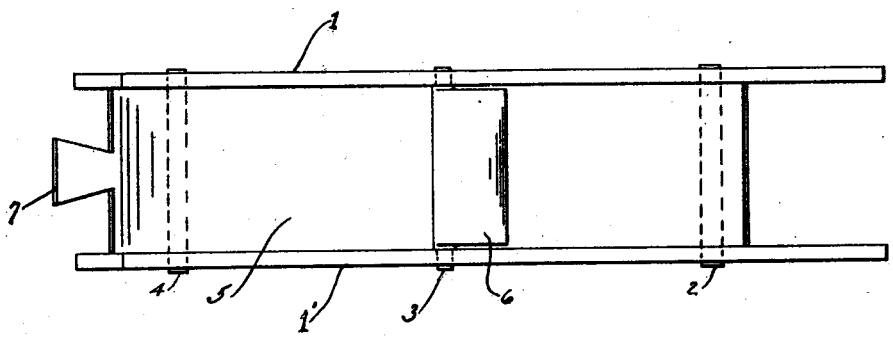
Fig. 2 is a plan view of the sled.

The sled comprises the usual runners 1 and 1' which are held apart in spaced relation by means of transverse rods 2, 3, and 4. A top board 5 is provided, and is supported upon the forward and rear transverse rods or spacers 2 and 4. Its approximately central portion passes beneath the transverse spacer 3. It will be seen, therefore, that this top board is bowed downwardly in its middle and projects upwardly at its ends, and also it is to be noted that such top board is positioned between the runners and below their top edges. By this mode of construction, a sled is provided which has a lowered top board, thereby providing sides to aid in the security of the rider's position.

A rest 6 may be formed integrally with the transverse spacer 3, or may be separately formed and secured thereto. This rest extends upwardly and forwardly at about the angle indicated in Fig. 1, and is adapted to support the rear upper portion of the legs of the rider when he is seated behind the rest and has his feet located upon the top board in front of the rest. In this manner the rider is secure in his position upon the sled, and also is given some support for his legs to prevent them from becoming cramped. Also, if the sled is suddenly stopped, the rest will prevent the riders sliding forwardly from the sled. The angular position of the rest may be conveniently maintained by forming the end portion of the spacer 3 of squared contour, and similarly forming the openings in the runners 1 and 2 of squared outline. In this manner the spacer 3 is prevented from rotating, and the rest is maintained in its correct angular position.

The sled may be provided with a rear handle which is preferably formed integrally with the top board. This handle 7 may comprise a dovetail shaped integral projection of the top board, and is found convenient in manipulating the sled.

It will be seen that a sled has been provided which is of novel construction, of pleasing contour, and which may be simply and readily manufactured.

I claim:

1. A sled comprising a pair of runners, a plurality of spacing members secured thereto and extending therebetween, a top board resting upon the spacers adjacent the ends of the sled and positioned beneath a spacer intermediate the ends of the sled.

2. A sled comprising a pair of runners, forward and rear spacers, and an intermediate spacer secured to and positioned between said runners, a top board resting upon the forward and rear spacers and passing below the intermediate spacer, and a rest extending upwardly from the intermediate spacer.

3. A sled comprising a pair of runners, forward and rear spacing members, and an intermediate spacing member joining said runners, a top board resting upon said forward and rear members and extending beneath said intermediate member, and a rest projecting upwardly and forwardly from said intermediate member.

4. A sled comprising a pair of spaced runners, a top board supported between said runners and downwardly bowed intermediate its ends, and a forwardly inclined rest supported from said runners above the downwardly bowed portion of the top board.

MARION T. CEBAR.